(12) United States Patent
Matthews

(10) Patent No.: US 8,297,706 B2
(45) Date of Patent: Oct. 30, 2012

(54) ERGONOMIC CHAIR

(76) Inventor: John P. Matthews, Columbia, MO (US)

( * ) Notice: Subject to any disclaimer, the term of this patent is extended or adjusted under 35 U.S.C. 154(b) by 445 days.

(21) Appl. No.: 12/560,183

(22) Filed: Sep. 15, 2009

(65) Prior Publication Data

US 2010/0066148 A1   Mar. 18, 2010

Related U.S. Application Data

(60) Provisional application No. 61/097,137, filed on Sep. 15, 2008.

(51) Int. Cl.
*A47C 7/50* (2006.01)

(52) U.S. Cl. .............................. 297/423.12; 297/423.11

(58) Field of Classification Search ............. 297/423.11, 297/423.12, 423.13
See application file for complete search history.

(56) References Cited

U.S. PATENT DOCUMENTS

| | | |
|---|---|---|
| 1,065,022 A | 6/1913 | Bell |
| 3,770,334 A | 11/1973 | Weber |
| 3,820,844 A | 6/1974 | Fortnam |
| 3,863,978 A | 2/1975 | Gillings, Jr. |
| 3,890,004 A | 6/1975 | Rail |
| 4,016,610 A | 4/1977 | Ordonez |
| 4,296,574 A | 10/1981 | Stephens |
| 4,328,991 A | 5/1982 | Mengshoel et al. |
| 4,377,309 A | 3/1983 | Mengshoel |
| D277,722 S | 2/1985 | Gusrud |
| 4,534,590 A | 8/1985 | Yamamura et al. |
| 4,552,404 A | 11/1985 | Congleton |
| D283,858 S | 5/1986 | Opsvik |
| 4,589,699 A | 5/1986 | Dungan |
| 4,614,378 A | 9/1986 | Picou |
| 4,650,249 A | 3/1987 | Serber |
| 4,673,216 A | 6/1987 | Alfer |
| 4,736,982 A | 4/1988 | Hwang |
| 4,765,684 A | 8/1988 | Kvalheim et al. |
| 4,767,159 A | 8/1988 | Opsvik |

(Continued)

FOREIGN PATENT DOCUMENTS

JP   20070177532   7/2007

OTHER PUBLICATIONS

"Kneeling Chairs". The Comfort Store. Posted Date: Unknown; Printed Date: Mar. 18, 2010 <http://www.palomar.edu/dsps/actc/mla/mlainternet.html>.

*Primary Examiner* — David Dunn
*Assistant Examiner* — Philip Gabler
(74) *Attorney, Agent, or Firm* — Hovey Williams LLP

(57) ABSTRACT

An ergonomic desk system and chair for promoting hip flexibility and strength and reducing lower back pain. The ergonomic desk system broadly comprises a variably positioned, raised platform, mounting assemblies for office peripherals, a recessed storage unit mounted on an underside of the platform, a lumbar support coupled to the platform, and a stool. Use of the desk system allows a user to sit on the platform in numerous positions while still performing routine office work. The ergonomic chair broadly comprises a base, a first, lower platform, and a second, upper platform spaced above the first, lower platform. The user sits on the second platform and rests their legs on the first platform in various positions. Use of the ergonomic chair results in the user rotating their pelvis to a position that is comfortable and properly aligned.

9 Claims, 15 Drawing Sheets

U.S. PATENT DOCUMENTS

| | | | |
|---|---|---|---|
| 4,767,160 A | 8/1988 | Mengshoel et al. |
| 4,772,071 A | 9/1988 | Richards |
| D299,594 S | 1/1989 | Richardson |
| 4,832,407 A * | 5/1989 | Serber | 297/423.12 |
| 4,852,500 A | 8/1989 | Ryburg et al. |
| 4,913,487 A | 4/1990 | Breckel et al. |
| 4,960,305 A | 10/1990 | Opsvik |
| 5,029,350 A | 7/1991 | Edelson |
| 5,186,519 A | 2/1993 | Larson |
| 5,251,961 A | 10/1993 | Pass |
| 5,255,957 A | 10/1993 | Opsvik et al. |
| D343,067 S | 1/1994 | Pass |
| 5,282,341 A | 2/1994 | Baloga et al. |
| 5,293,720 A | 3/1994 | Brice et al. |
| 5,321,579 A | 6/1994 | Brown et al. |
| 5,330,254 A | 7/1994 | Larson |
| 5,369,805 A | 12/1994 | Bergsten et al. |
| 5,490,716 A | 2/1996 | Naughton |
| 5,542,746 A | 8/1996 | Bujaryn |
| 5,577,800 A | 11/1996 | Earl, Jr. |
| 5,630,648 A | 5/1997 | Allard et al. |
| 5,667,278 A | 9/1997 | Li |
| 5,669,669 A | 9/1997 | Usher |
| 5,743,193 A | 4/1998 | Kakuta et al. |
| 5,782,532 A * | 7/1998 | Opsvik | 297/338 |
| 5,836,653 A | 11/1998 | Albecker |
| 5,847,747 A | 12/1998 | Ishikawa |
| 5,865,507 A | 2/1999 | Earl, Jr. |
| 5,983,418 A | 11/1999 | Goodman et al. |
| D425,713 S | 5/2000 | Tholkes et al. |
| D428,713 S | 8/2000 | Arko et al. |
| D433,854 S | 11/2000 | Diffrient |
| 6,302,413 B1 | 10/2001 | Comeaux |
| 6,422,646 B1 | 7/2002 | McNally |
| 6,578,217 B1 | 6/2003 | Roberson |
| 6,701,682 B2 | 3/2004 | Ando et al. |
| 6,712,008 B1 | 3/2004 | Habenicht et al. |
| 6,739,096 B2 | 5/2004 | Feldpausch et al. |
| 6,783,105 B2 | 8/2004 | Oddsen, Jr. |
| D496,803 S | 10/2004 | Bjurman |
| D499,259 S | 12/2004 | Bjurman |
| 6,923,413 B2 | 8/2005 | Dozier |
| 6,935,250 B1 | 8/2005 | Arnold |
| D510,485 S | 10/2005 | Selby |
| 6,986,556 B2 | 1/2006 | Haberman |
| 7,048,242 B2 | 5/2006 | Oddsen, Jr. |
| D522,261 S | 6/2006 | Whiteside et al. |
| 7,063,296 B2 | 6/2006 | Williams |
| 7,070,241 B2 | 7/2006 | Saulnier et al. |
| 7,086,702 B1 | 8/2006 | Hurt |
| 7,183,504 B2 | 2/2007 | Byrne |
| 7,210,724 B2 | 5/2007 | Bernstein et al. |
| 7,300,029 B2 | 11/2007 | Petrick et al. |
| 7,367,623 B2 | 5/2008 | Tholkes et al. |
| 2002/0017595 A1 | 2/2002 | Koyanagi |
| 2003/0168899 A1 * | 9/2003 | Voyce, IV | 297/423.11 |
| 2004/0003545 A1 | 1/2004 | Gillespie |
| 2006/0097555 A1 | 5/2006 | Meleger |
| 2006/0170273 A1 | 8/2006 | Ige et al. |
| 2006/0238967 A1 | 10/2006 | Carson et al. |
| 2007/0007400 A1 | 1/2007 | James |
| 2007/0063569 A1 * | 3/2007 | Mays | 297/423.12 |
| 2007/0126271 A1 | 6/2007 | Brodeur |
| 2008/0134591 A1 | 6/2008 | Repasky |
| 2008/0134601 A1 | 6/2008 | Cruz |

* cited by examiner

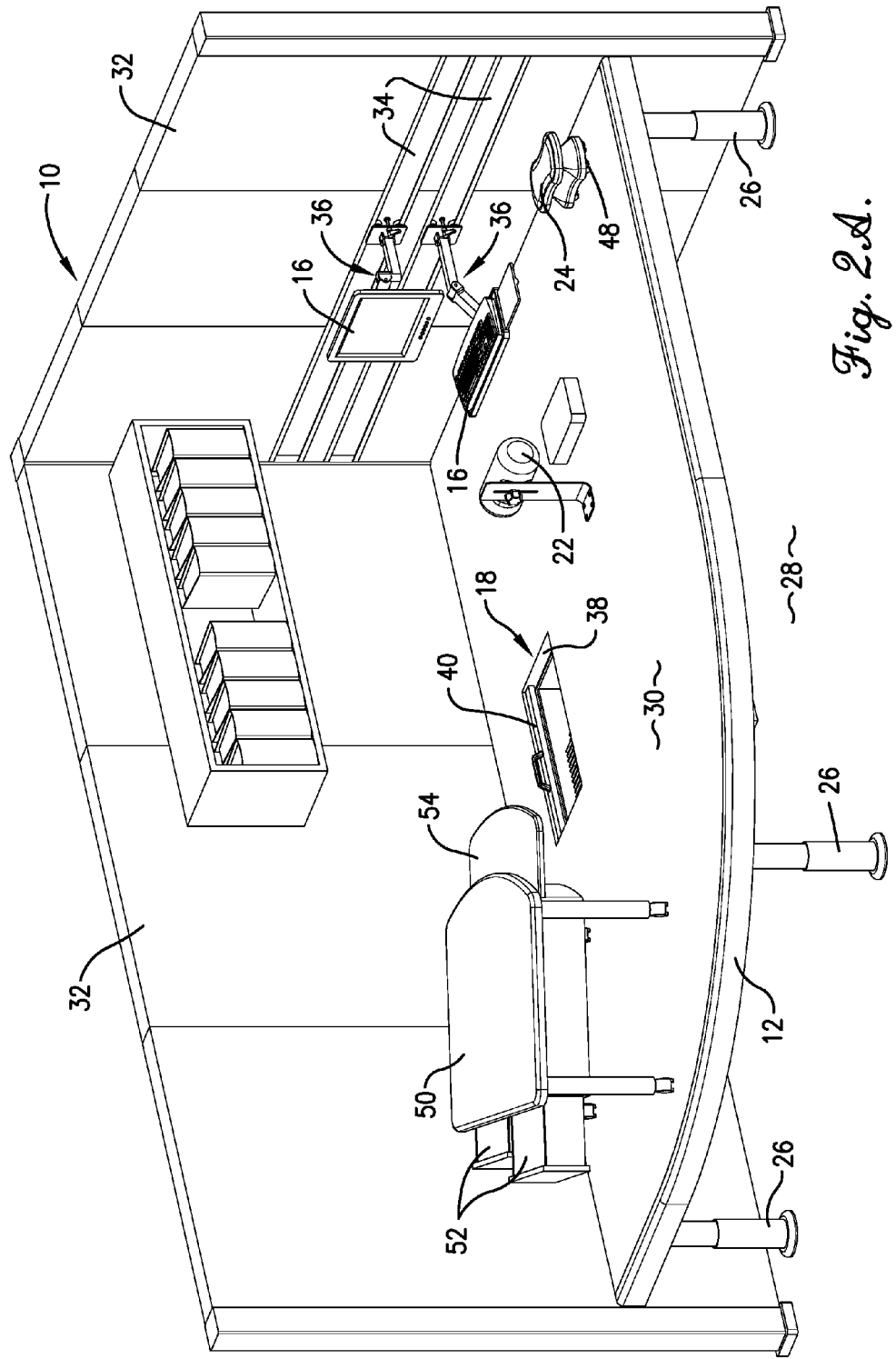

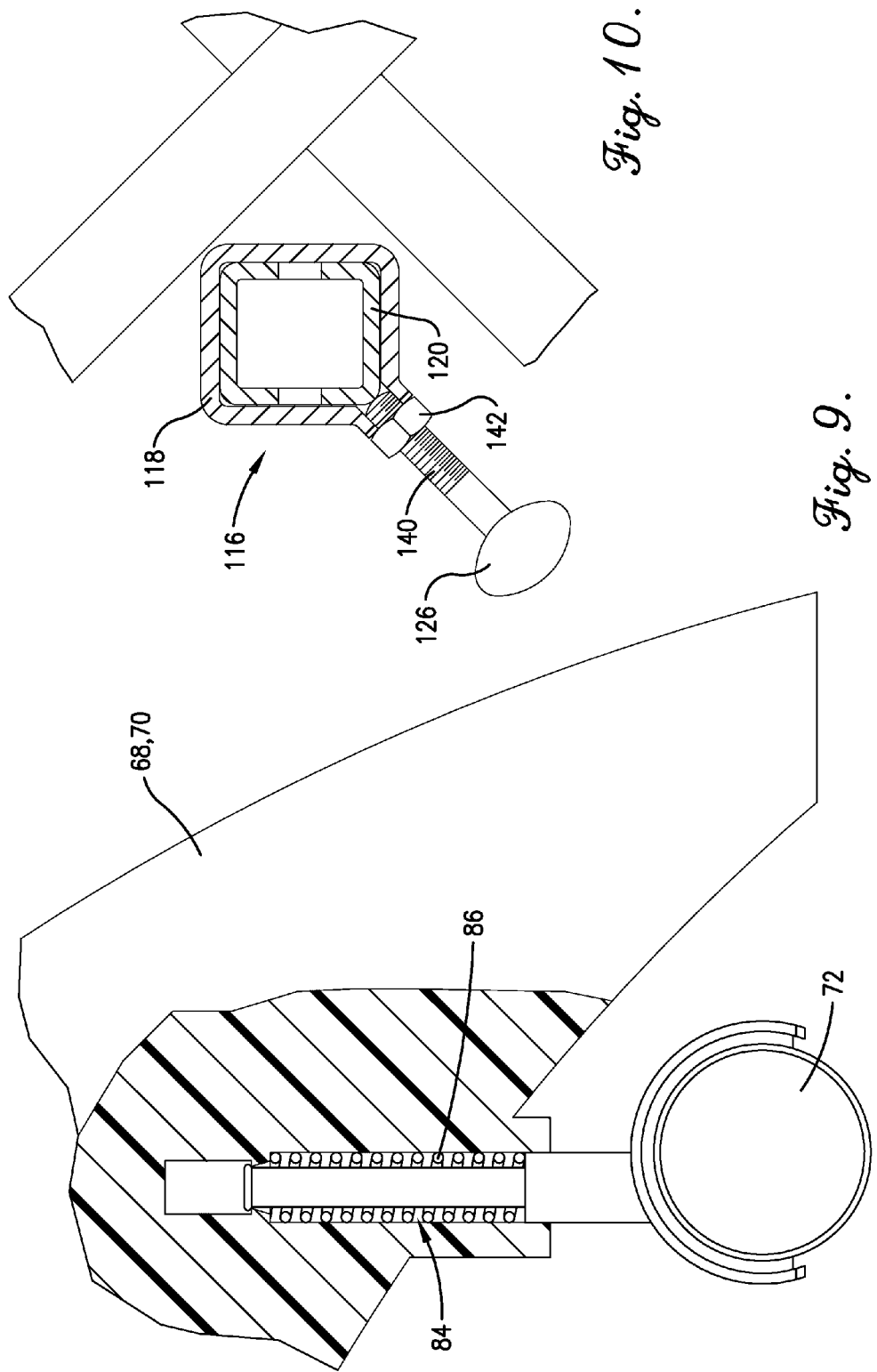

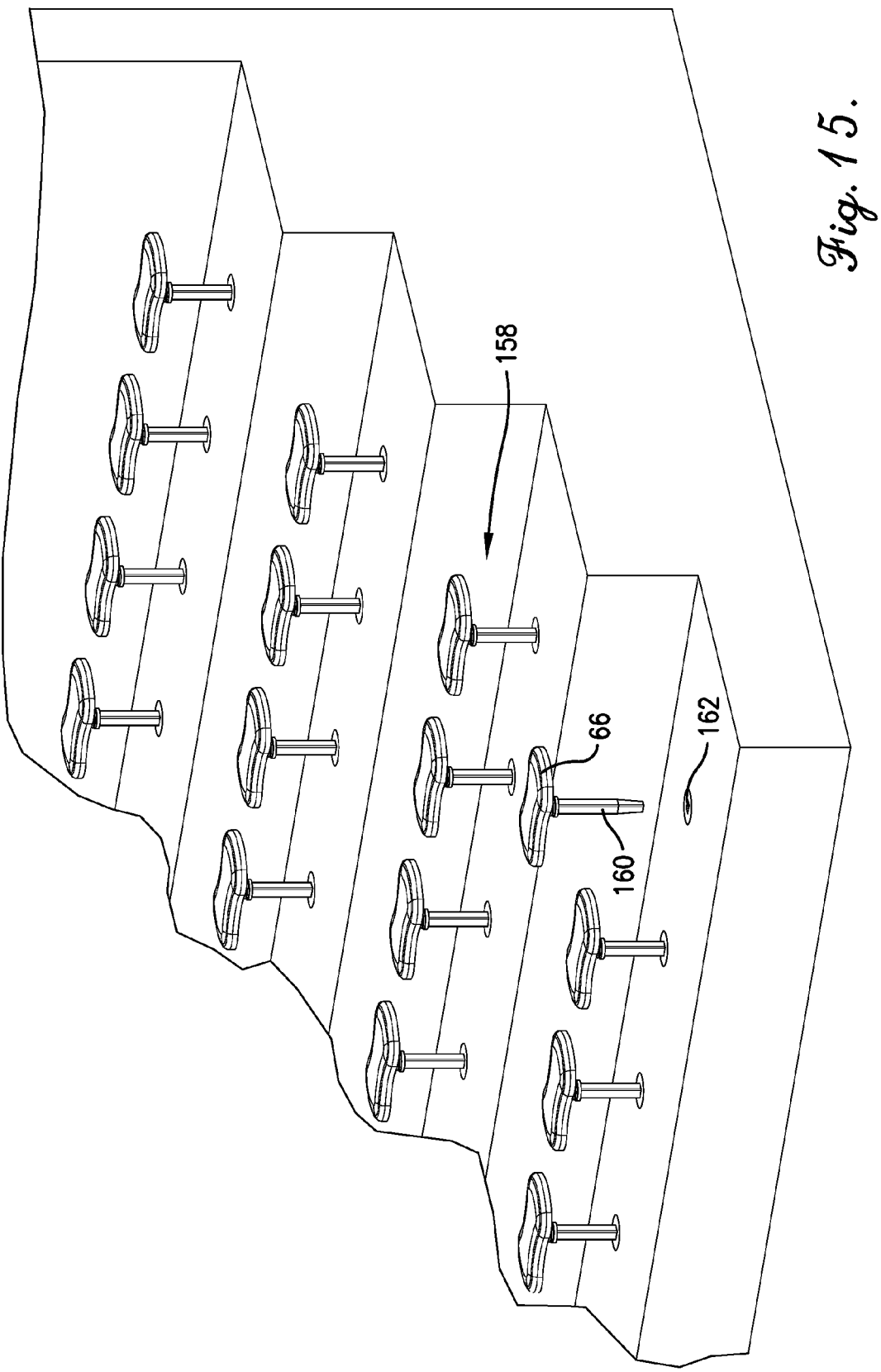

ERGONOMIC CHAIR

RELATED APPLICATION

This non-provisional patent application claims priority benefit, with regard to all common subject matter, of earlier-filed U.S. Provisional Patent Application No. 61/097,137, filed Sep. 15, 2008, and entitled "ERGONOMIC DESK SYSTEM." The identified earlier-filed provisional application is hereby incorporated by reference in its entirety into the present application.

FIELD

Embodiments of the present invention relate to ergonomic desk systems and chairs that assist a user in maintaining and/or increasing flexibility and strength. More particularly, embodiments of the present invention relate to an ergonomic desk system that allows a user to sit on a raised platform and access common items located at a desk, such as a computer and a monitor, files and books, and writing and reading surfaces. Other embodiments of the present invention relate to an ergonomic chair that allows the user to sit in a position that maintains and/or increases flexibility and strength in the user's hips and relieves back pain.

BACKGROUND

The human pelvis supports the spine to maintain its natural curve in a vertical position with minimal need for support from lower back musculature. When the ischial tuberosities (or sitting bones) of the lower pelvis encounter a firm and level surface, their position at the back of the pelvis shifts the center of gravity toward the pelvis's heavier forward half. The persistent pull of gravity on the heavy pelvis is transferred through the rigid bone structure to the base of the spine propped up at the bones as a fulcrum. This pelvic movement creates lift that the lower spine needs to rise up and away from the pelvis. In this manner, the skeletal system finds its ideal posture. One of the many benefits of this alignment is the creation of the space needed for the diaphragm to function properly.

Unfortunately, a conventional desk system and chair commonly provide upper back and lumbar support, which encourages a user to rest their back against the supports while in use. Support in these areas is not conducive to maintaining and/or increasing flexibility and strength in certain joints, such as the hip joints, and in the lower back. In fact, the conventional desk system and chair prompt the user to sit in a position, often many hours at a time, that is directly contrary to human physiology. This results in a loss of flexibility in hip joints and lower back pain, which are common ailments for office workers who spend upwards of eight to ten hours per day in a traditional office chair.

Though there has been some improvement in conventional desk systems and chair configurations achieving ergonomic goals of relieving stress on the lower back and wrists, prior art desk systems and chair configurations still force a user in a position that decreases muscle and joint flexibility. Even the most ergonomically advanced chairs promote a tilt to the pelvis that is opposite of the desired tilt so as to keep the pelvis from sliding off the seat. Lumbar support actually encourages further counter-tilting of the pelvis.

Additionally, research shows that conventional office seating implicates weight gain. In particular, sitting in conventional chairs does not engage the large pelvic muscles the body is designed to use to maintain proper spine alignment and posture. As a result, the body shuts down its fat processing enzymes, as if it were asleep, within just 45 minutes of conventional chair sitting.

Accordingly, there is a need for a desk system and chair that allow a user to sit for extended periods of time while maintaining and/or increasing flexibility and strength.

SUMMARY

Embodiments of the present invention solve the above-described problems and provide a distinct advance in the art of ergonomic desk systems and chairs. In particular, embodiments of the present invention provide a desk system that allows a user to sit in various positions to promote hip flexibility and strength and to relieve lower back pain. The desk system of embodiments of the present invention broadly comprises a variably vertically positioned, raised platform; mounting assemblies for office peripherals; a recessed storage unit mounted on an underside of the platform; a lumbar support coupled to the platform; and a stool. Use of the desk system allows the user to sit on the platform in numerous positions while still performing routine office work. When the user desires to exit the platform, the user may easily dismount the raised platform without having to raise from a seated position on the floor, which is particularly helpful for persons with knee or hip pain.

In other embodiments of the present invention, an ergonomic chair is provided that assists in reducing a loss of flexibility and strength occurring from multiple hours sitting in a traditional office chair. The ergonomic chair broadly comprises a base; a first, lower platform; and a second, upper platform spaced above the first, lower platform. A user sits on the second platform and rests their legs on the first platform in various positions. Use of the ergonomic chair results in the user rotating their pelvis to a position that is comfortable and properly aligned. Moreover, a respective height of the first and second platforms can be readily varied to accommodate the user's preferred seating position, which may change from day to day and even hour to hour depending on the task and the changing conditions of flexibility and comfort in the user's legs, hips, and feet.

BRIEF DESCRIPTION OF THE DRAWING FIGURES

Embodiments of the present invention are described in detail below with reference to the attached drawing figures, wherein:

FIG. 2A is a top perspective view of the desk system of FIG. 2 but showing an alternative where a movable desk is used with the desk system;

FIG. 9 is a horizontal, cross-sectional view through line 9-9 of FIG. 8 and illustrating a castor secured to the base of the ergonomic chair of FIG. 4;

FIG. 10 is a horizontal, cross-sectional view through line 10-10 of FIG. 6A and illustrating a portion of the second mounting assembly;

FIG. 15 is an even further alternative embodiment of the ergonomic chair of the present invention and illustrating the second platform of the chair being removably mounted to stadium-style seating.

Figure 1:
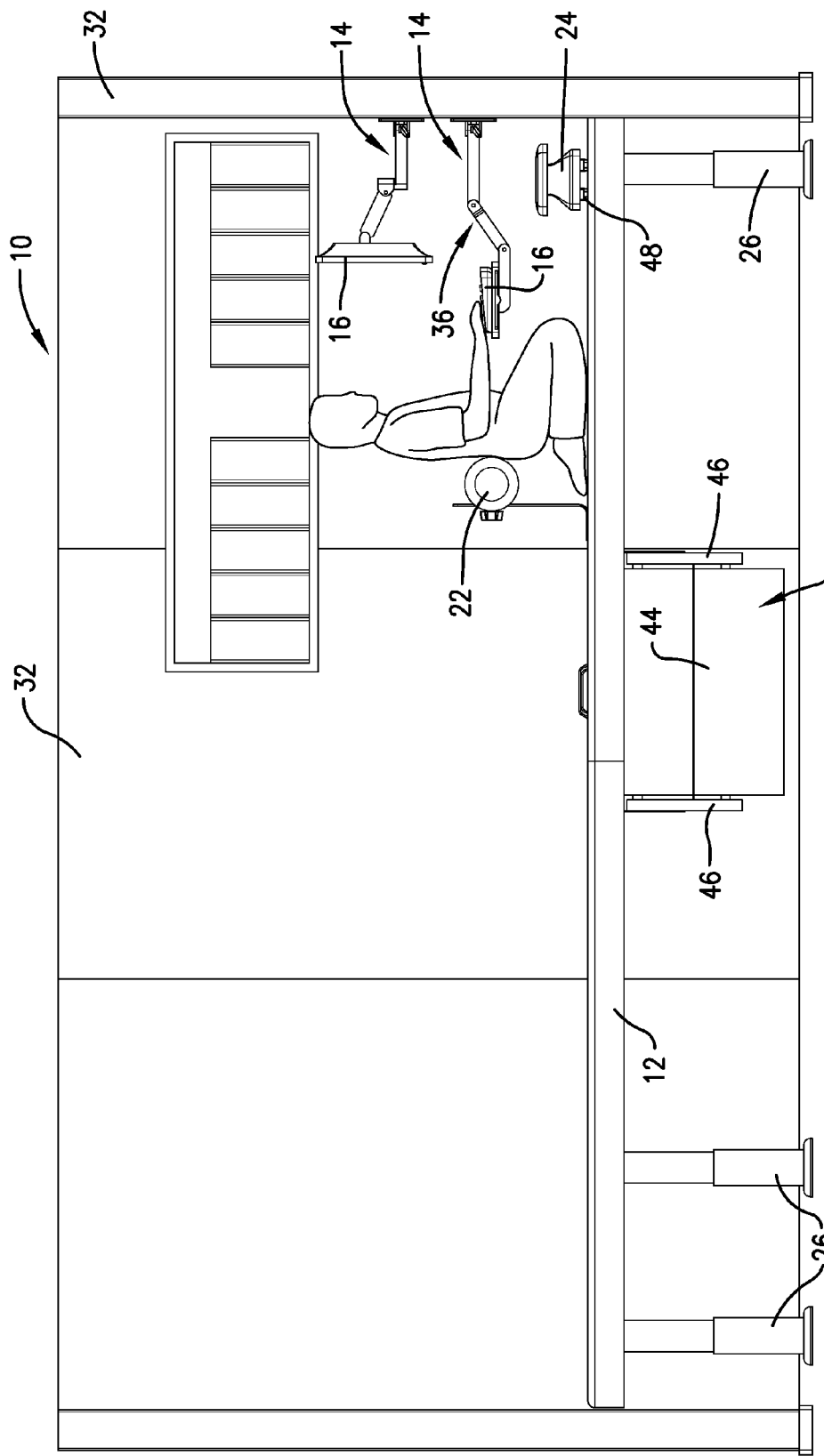
FIG. 1 is a side elevation view of an ergonomic desk system of embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Ergonomic Desk System

Figure 2:
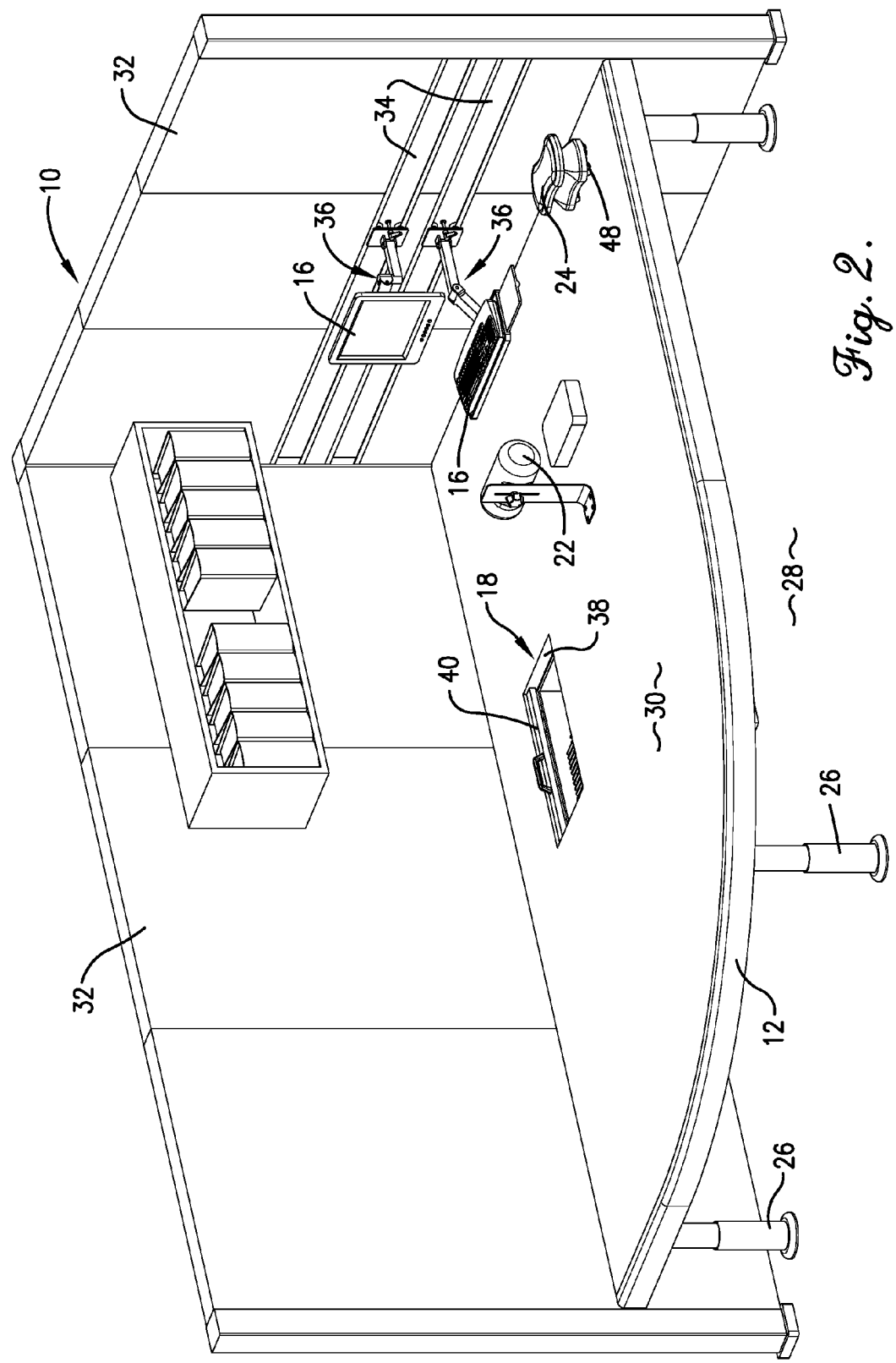
FIG. 2 is a top perspective view of the desk system of embodiments of the present invention.
Figure 3:
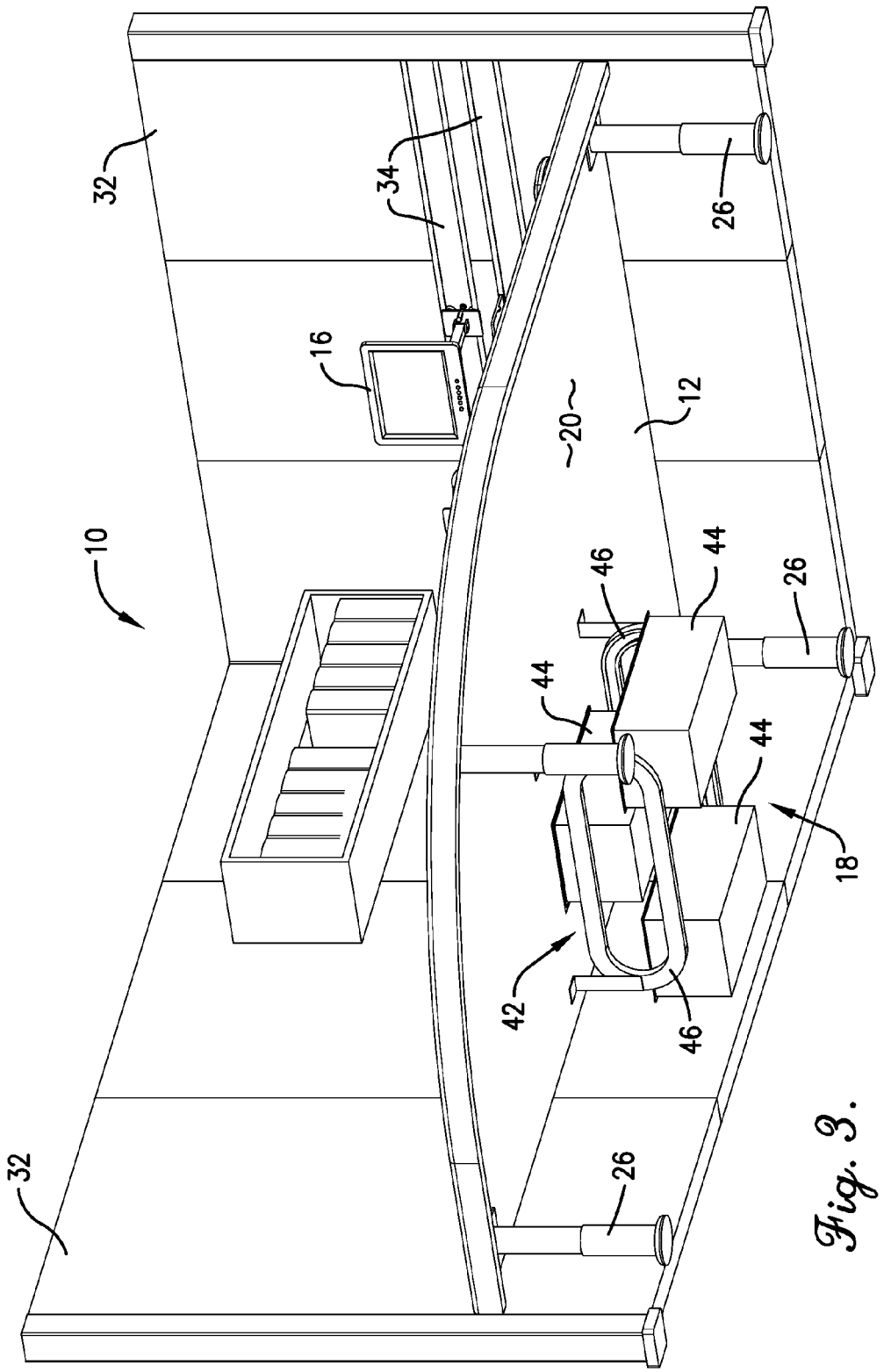
FIG. 3 is a bottom perspective view of an underside of the desk system of FIG. 2.

Turning now to the drawing figures, and particularly FIGS. 1-3, an ergonomic desk system 10 is illustrated that assists in reducing a loss of flexibility and strength occurring from multiple hours sitting for office work or other purposes. The desk system 10 generally comprises a variably vertically positioned, raised platform 12; mounting assemblies 14 for office peripherals 16; a recessed storage unit 18 mounted on an underside 20 of the platform 12; a lumbar support 22 coupled to the platform 12; and a stool 24.

In embodiments of the present invention, the variably vertically positioned, raised platform 12 is mounted on legs 26 that can be positioned to a preferred height, usually approximately 15-21 inches from a floor 28. The legs 26 can be variably positioned using a variety of known mechanisms, such as, without limitation, hydraulic lifts, scissor lifts, or locking detent and hole assemblies.

The platform 12 is raised so as to allow a user to easily dismount or exit the desk system 10. As can be appreciated, for many users, it may be difficult to stand up from a sitting position or other low position relative to the floor 28. In such instances, the raised platform 12 allows the user to exit the desk system 10 easily. In alternative embodiments of the present invention, the platform 12 may not be variably vertically positioned but still be raised from the floor 28 a certain height by simply mounting the platform 12 on legs 26 having a length equivalent to a preferred height of the platform 12. In even further embodiments of the present invention, the platform 12 may be angled to provide a pitched seating surface that can be adjusted to a comfortable angle, preferably up to 15° above horizontal, in a direction the user chooses to face. Angling the platform 12 could be accomplished by positioning certain legs 26 at a different height than other legs 26, depending on the desired angle and direction.

The platform 12 may be any desired shape, such as, without limitation, rectangular, triangular, kidney shaped, or circular. As can be appreciated, the shape of the platform 12 may be designed to accommodate an existing work area within a room or an office cubicle. In alternative embodiments of the present invention, the raised platform 12 only encompasses a portion of the work area or cubicle so as to allow space for conventional seating, desks, filing cabinets, and shelves.

The platform 12 may include a cushioned surface 30 that assists in easing the multiple hours of sitting on the platform 12. For example, the platform 12 may be carpeted with traditional padding underneath the carpet or may be covered partially or completely with foam, rubber, or other suitable material. Further, specific locations on the platform 12 may include more or less of the cushioned surface 30, such as illustrated in FIG. 2 proximal the lumbar support 22, depending on whether the location is expected to receive more or less use by the user.

In alternative embodiments of the present invention, the platform 12 is at least partially shock absorbent. Such may be accomplished through the use of traditional shocks absorbers (not shown) mounted to the underside 20 of the platform 12. Alternatively, the platform 12 could be a spring platform.

As noted above, the platform 12 may be located in a work area in a room or in a cubicle. In embodiments of the present invention, at least one side of the platform 12 is adjacent a wall 32, regardless of whether the wall is freestanding or permanent. In FIGS. 1-3, traditional cubicle walls 32 are illustrated.

The desk system 10 of embodiments of the present invention includes the mounting assemblies 14 secured to the wall 32 and operable to mount various office peripherals 16 thereto. As best illustrated in FIGS. 2-3, tracks 34 are secured to the wall 32. The user's computer monitor, keyboard, and other peripherals 16, such as a telephone, can then be mounted on the tracks 34. The tracks 34 preferably allow for at least either horizontal or vertical movement of the mounted peripherals 16 along the wall 32. The peripherals 16 are also preferably mounted on at least a two-axes boom 36, such that the peripherals 16 can be moved along three axes (via the tracks 34 and the boom 36) to any desired angle and location by the user. Other office components that do not need to be readily accessed on a daily basis, such as cables and cords, may be stored underneath the platform 12 and generally out-of-sight.

In alternative embodiments of the present invention, the boom 36 on which the peripheral 16 is mounted includes joints (not shown) that can maintain a position in space and remember a position in which the user chooses to place the peripheral 16. The joints preferably comprise servo motors (not shown) and incorporate three-dimensional gyroscope chip sets (not shown) coupled to sensors (not shown) and the servo motors, such that the boom 36 will remember and maintain a position in space. The boom 36 may return itself to any number of preset positions on powering up, thereby accommodating the preferences of multiple users at the same desk system 10s.

In alternative embodiments of the present invention, the platform 12 is not adjacent any wall. In such an instance, common office peripherals 16, such as the computer and monitor, may be located on a desk positioned closer to the floor, such as approximately 15-21 inches, than traditional office desks.

Referring to FIGS. 1 and 3, the desk system 10 includes at least one recessed storage unit 18 mounted on the underside 20 of the platform 12 and accessible from the topside via an opening 38 formed in the platform 12 and covered with a retractable cover 40. In embodiments of the present invention, the recessed storage unit 18 is a carousel system 42, as best illustrated in FIG. 3, that allows multiple storage receptacles 44 to be accessed via the opening 38. File folders and other office supplies can be stored in the storage receptacles 44. The user may rotate the receptacles 44 along carousel tracks 46 so as to position the desired receptacle 44 adjacent the opening 38. In alternative embodiments of the present invention, the storage unit 18 need not be the carousel system 42 and instead, may comprise one or more recessed units 18 accessible via one or more openings 38 and retractable covers 40.

The lumbar support 22 is mounted to the topside of the platform 12. In embodiments of the present invention, the platform 12 may include various quick-couple locations where the lumbar support 22 can be quickly removably coupled to the platform 12. Alternatively, the lumbar support 22 may be permanently coupled to the platform 12 in one location. The lumbar support 22 is also preferably height adjustable for preferred user positioning.

The desk system 10 also includes the stool 24, which is preferably positioned low relative to the platform 12, such that the stool 24 has a height of approximately 10-15 inches. The stool 24 may be used in conjunction with or separate from the lumbar support 22. The stool 24 includes castors 48 located on an underside of the stool 24 for pivoting, swiveling, and moving about the platform 12. Alternatively, the stool 24 could include swivels, glides, embedded tracks, or any combination of the above for moving about the platform 12. In preferable use, the user sits on the stool 24 and leans their knees against the platform 12 or extends their legs out to rest on the platform 12.

In alternative embodiments of the present invention, the desk system 10 includes a movable desk 50, as illustrated in FIG. 2A. The desk 50 is preferably much lower to the platform 12 than traditional desks but high enough off the platform 12 that the user's legs can comfortably be positioned under the desk 50. As illustrated in FIG. 2A, the desk 50 preferably has a height of approximately 12-25 inches and more preferably approximately 15-20 inches, and most preferably approximately 18 inches. The desk 50 may include drawers 52 and pull-out leaves 54. In alternative embodiments of the present invention, a movable desk (not shown) may be located on the floor 28 and have an L-shaped base that allows the base to move under the platform 12 for positioning of the top of the desk at a preferred height above the platform 12 for use.

In even further embodiments of the present invention, the user may be able to variably position the platform 12 height during work so as to access extra-high file cabinets alongside the desk system's walls 32. A motorized wheel, or floor track system, could also provide the user with access to any other area in the room.

The desk system 10 of embodiments of the present invention can be manufactured as either a free-standing version or retrofitted into existing cubicle systems. Additionally, and as noted above, all peripherals 16 are movably positioned in at least two dimensions, and preferably three dimensions, to accommodate the user's vertically neutral spine and optimally tilted pelvis.

Ergonomic Chair

Turning now to the drawing figures, and particularly FIGS. 4-15, an ergonomic chair 60 is illustrated that, similar to the ergonomic desk system 10 described above, assists in reducing a loss of flexibility and strength occurring from multiple hours sitting in a traditional chair. The ergonomic chair 60 generally comprises a base 62; a first, lower platform 64; and a second, upper platform 66 spaced above the first, lower platform 64. The ergonomic chair 60 of embodiments of the present invention allows the user to sit in a position that rotates the pelvis to a more natural position, as described in detail below.

Figure 4:
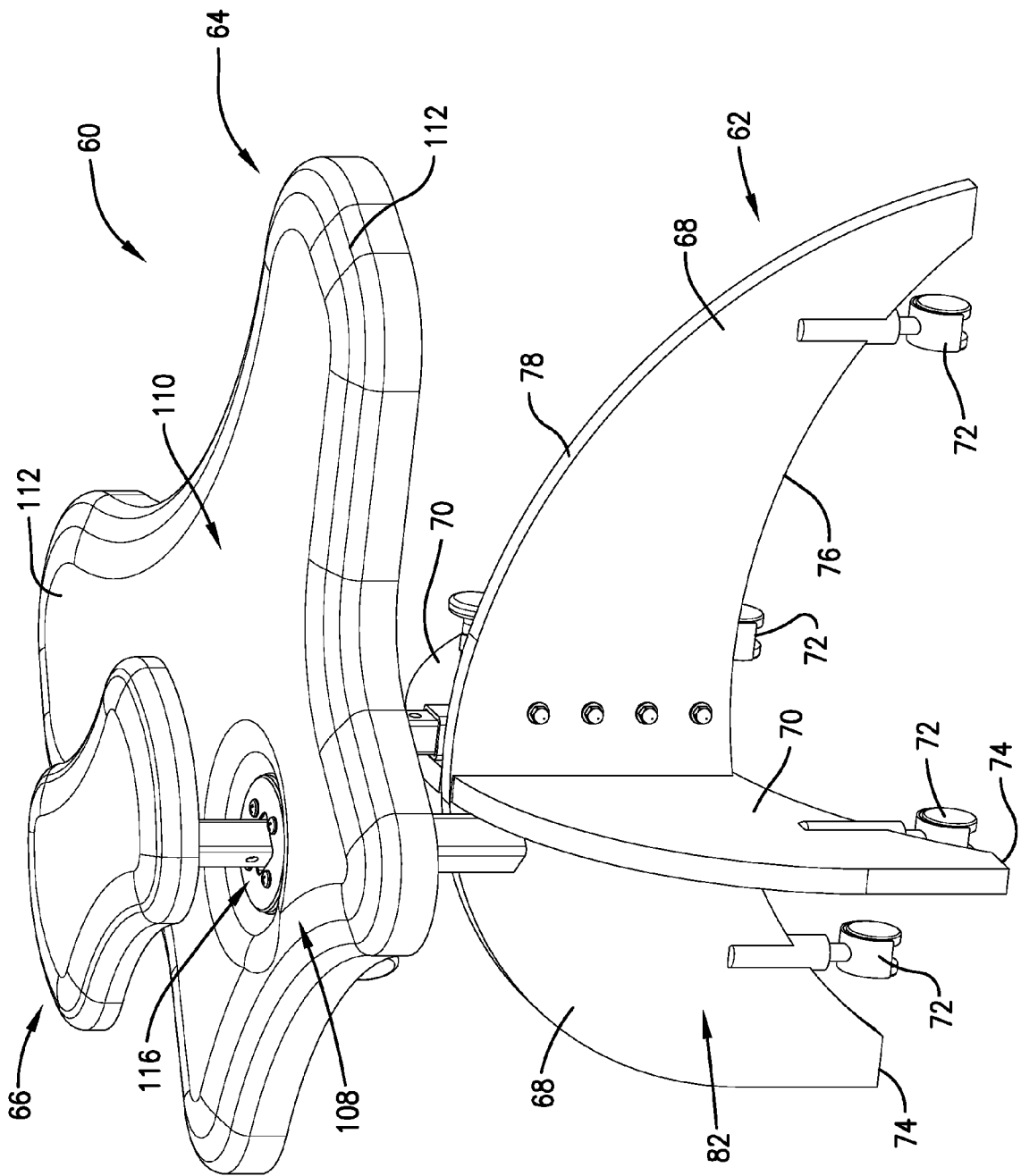
FIG. 4 is a perspective view of an ergonomic chair of embodiments of the present invention and, generally comprising a base, a first platform, and a second platform.

As illustrated in FIGS. 4-5 and 11-12, the base 62 of the chair 60 includes first and second interconnecting supports 68,70 having a plurality of castors 72 connected thereto to assist in moving the chair 60. The interconnecting supports 68,70 are each approximately 14 inches in height (from a bottom to a top of each support 68,70), approximately 27 inches in length (from a left to a right side of each support 68,70), and approximately 1.5 inches in width. Referring to FIG. 4, each support 68,70 includes two flat edges 74 that contact a floor during use of the chair 60, a lower arcuate edge 76, and an upper arcuate edge 78. Each flat bottom 74 is approximately 1.5 inches in length. The lower arcuate edge 76 is approximately 30 inches in length and with a radius of approximately 6 inches, and the upper arcuate edge 78 is approximately 39 inches in length with a radius of approximately 14 inches. It is to be appreciated that the dimensions of the supports 68,70 can be changed to accommodate varying sized chairs 60.

Figure 12:
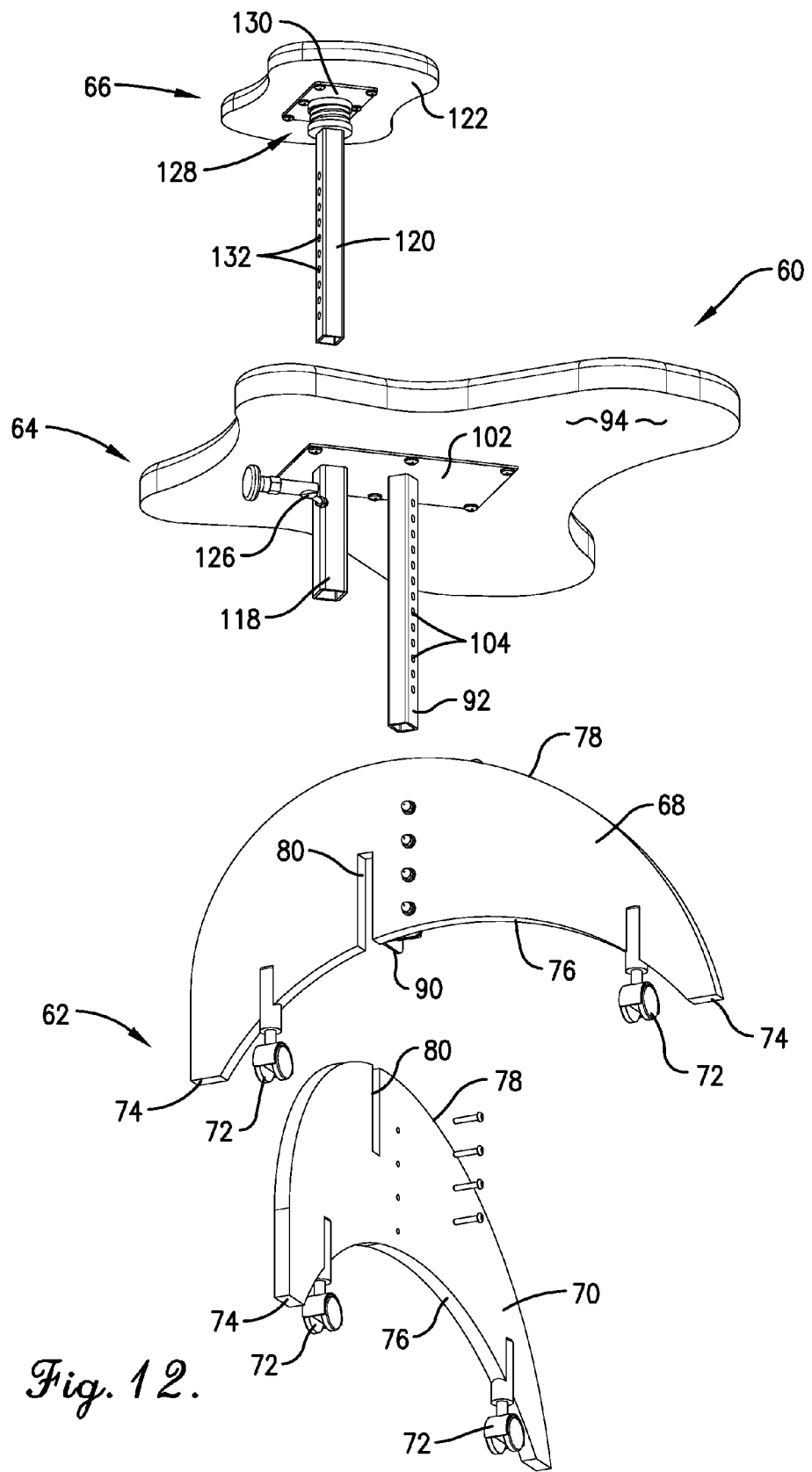
FIG. 12 is an exploded view of the ergonomic chair of FIG. 4 and particularly illustrating the underside of the chair.

As best illustrated in FIG. 12, each support 68,70 includes a slot 80, such that the supports 68,70 are connected together by interconnecting the slots 80. Once interconnected, the supports 68,70 are positioned generally 90° to each other. Each slot 80 is approximately 0.75 inch in width and approximately 4 inches in length.

Referring again to FIG. 4, the slots 80 are positioned at approximately 8.5 inches from a left side 82 of the support 68 when viewing the support 68 in FIG. 4 from left to right. Therefore, the slots 80 are positioned at approximately one-third the length of the supports 68,70 when viewed from left to right, such that the length of the supports 68,70 forward of the respective slot 80 is approximately twice as long as the length of the support rearward of the respective slot 80, so as to balance the weight of the user's legs positioned on the first platform 64 and as described below.

As illustrated in FIGS. 4 and 9, the base 62 of the chair 60 includes the plurality of castors 72 to assist in moving the chair 60 within a space. The castors 72 are retractable via a compressible spring retaining mechanism 84, as illustrated in FIG. 9. By pushing the castor 72 upwards, a spring 86 compresses, and the castor 72 can be retained or locked into place so that it is not touching the floor. This may be desirable during use of the chair 60 so that the user does not unintentionally move it. In alternative embodiments of the present invention, mobility of the chair 60 can be enhanced by combining the base 62 with motorized wheels and intuitive toggle controls for the user, which could provide rolling movement in all directions.

In alternative embodiments of the present invention, the base 62 may be a traditional chair base (not shown) having a generally vertical support, serving as a hub, and a plurality of generally horizontal arms, serving as spokes, extending from a lower end of the vertical support. Castors (not shown) are mounted on the arms to facilitate movement of the chair 60.

Figure 5:
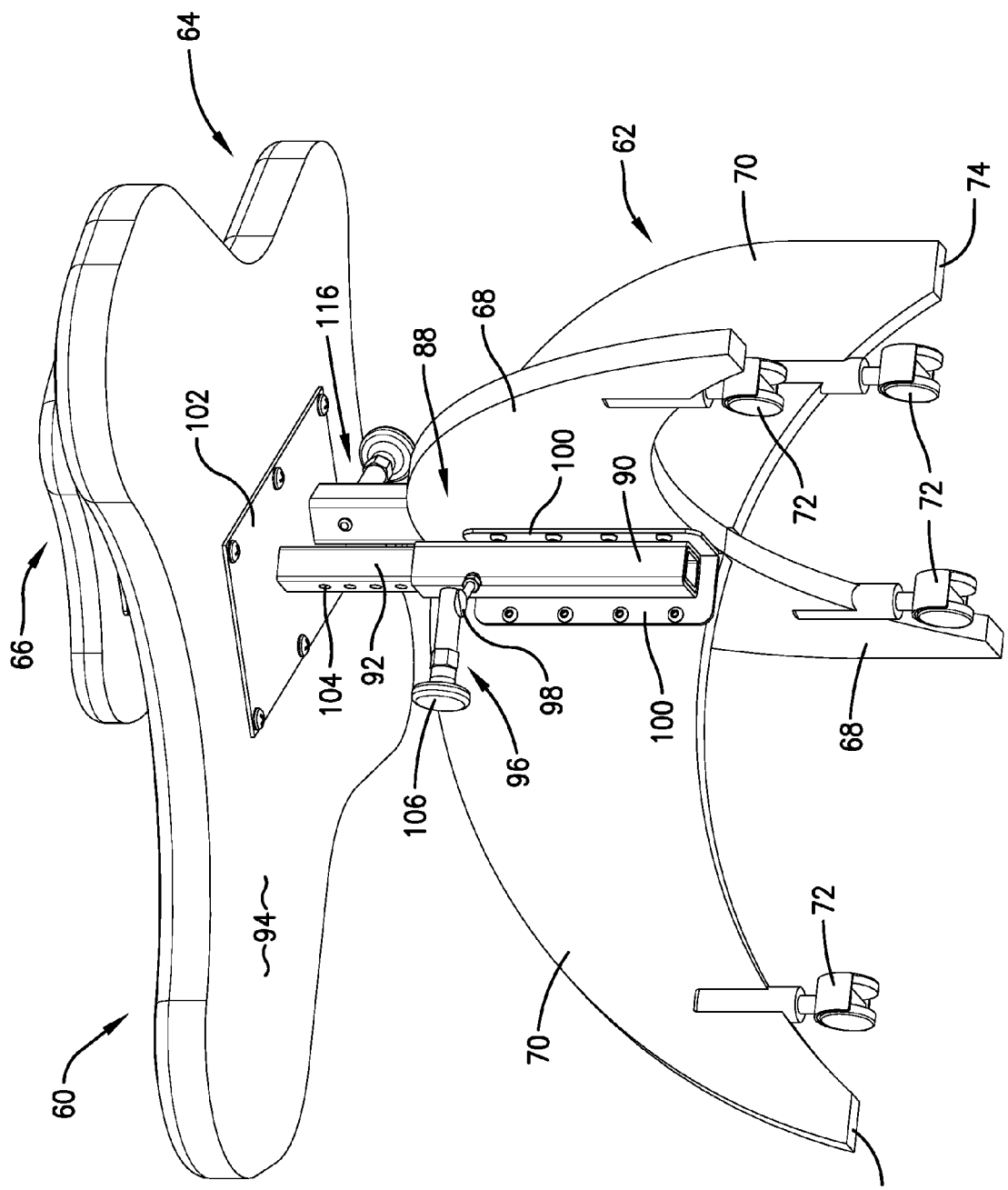
FIG. 5 is a perspective view of an underside of the ergonomic chair of FIG. 4.

Referring to FIG. 5, the first, lower platform 64 is connected to the base 62 via a height-adjustable first mounting assembly 88 comprising a first, outer tube 90 secured to the base 62, a telescoping second, inner tube 92 secured to an underside 94 of the first platform 64, a first spring-loaded lock 96 coupled to the first tube 90 for removably locking the first and second tubes 90,92 together, and a thumbscrew 98 for tightening the second tube 92 around the first tube 90.

Figure 11:
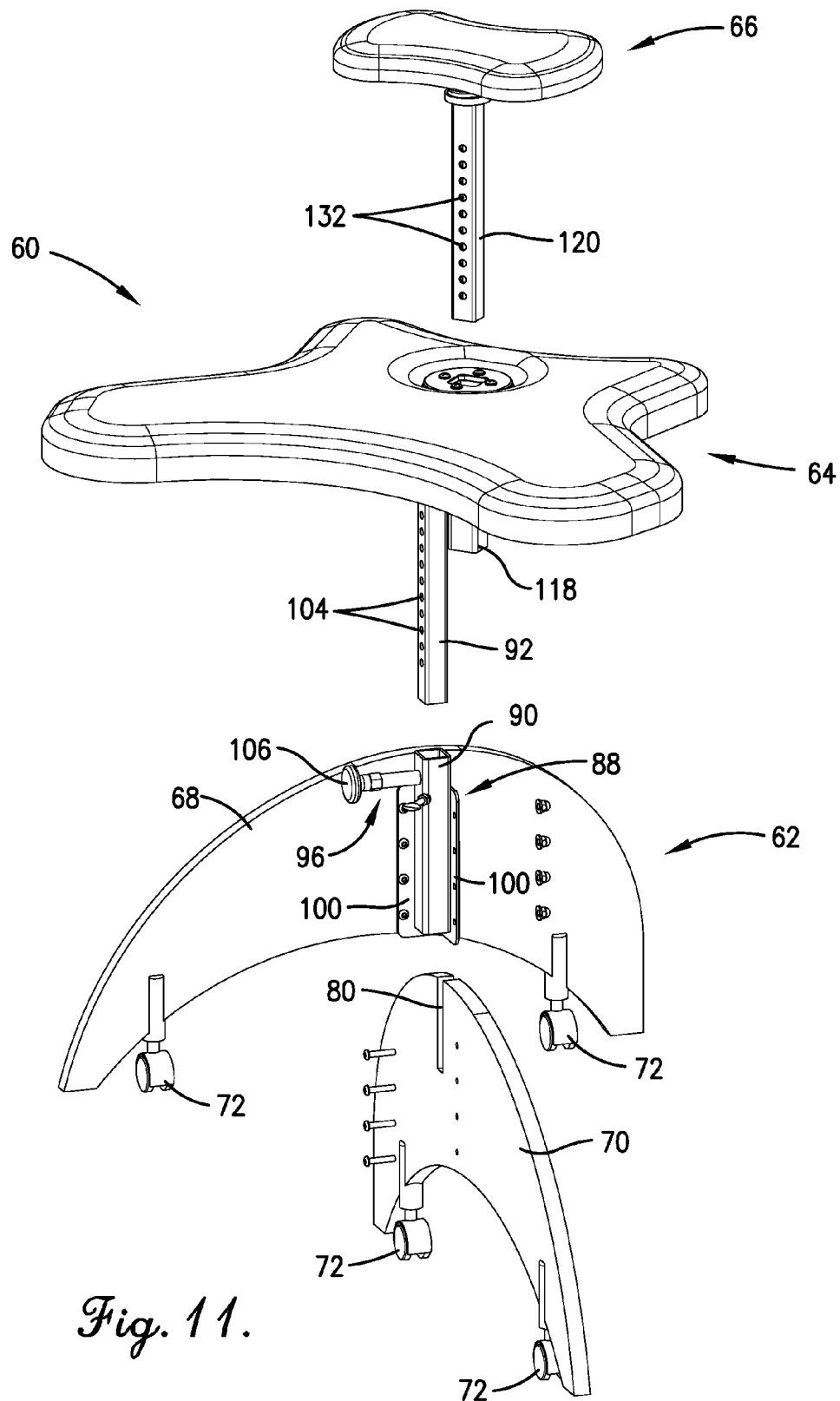
FIG. 11 is an exploded view of the ergonomic chair of FIG. 4.

In more detail and referring to FIGS. 11-12, the first and second telescoping tubes 90,92 are preferably generally rectangular and formed of steel or other suitable material capable of withstanding the weight of the user. The first tube 90 is welded to or otherwise integral with a pair of vertical plates 100 joined at an approximately 90° angle and respectively secured to the first and second supports 68,70 of the base 62. Similarly, the first tube 90 is welded to or otherwise integral with a first horizontal plate 102 secured to the underside 94 of the first platform 64. As can be appreciated, varying-shaped tubes 90,92 may be used, such as square or circular.

As noted above, the second tube 92 telescopes within the first tube 90, such that the second tube 92 has a smaller diagonal than the first tube 90. As best illustrated in FIG. 12, the second tube 92 includes a plurality of openings 104 vertically spaced approximately equidistant along at least a portion of a length of the second tube 94. The first spring-loaded lock 96 coupled to the first tube 90 can then be used to manually select an exposed length of the second tube 92, and therefore, a height of the first platform 64 relative to the base 62.

In particular, the first spring-loaded lock 96 includes a handle 106, a spring (not shown) operable to be manually compressed by forward actuation of the handle 106, and a pin (not shown) having a length approximately the same as or less than a width of the first tube 90 and a diameter less than a diameter of the vertically spaced openings 104 along the second tube 92. The user can manually forward actuate the handle 106 to compress the spring and push the pin through a selected opening. Once the pin is positioned through the selected opening, the user can release the forward actuation of the handle 106, which releases the tension on the spring. The height of the first platform 64 can then be readjusted by repeating the above locking process for the first spring-loaded lock 96. As can be appreciated, other locking mechanisms can be employed for removably and securely locking the first platform 64 at a preferred height, such as pneumatics or electro-mechanical servo control.

The thumbscrew 98 secured to the first tube 90 can be rotated or tightened to reduce the diagonal of the first tube 90 and therefore, lessen any slack or extraneous space between the first and second tubes 90,92.

Figure 8:
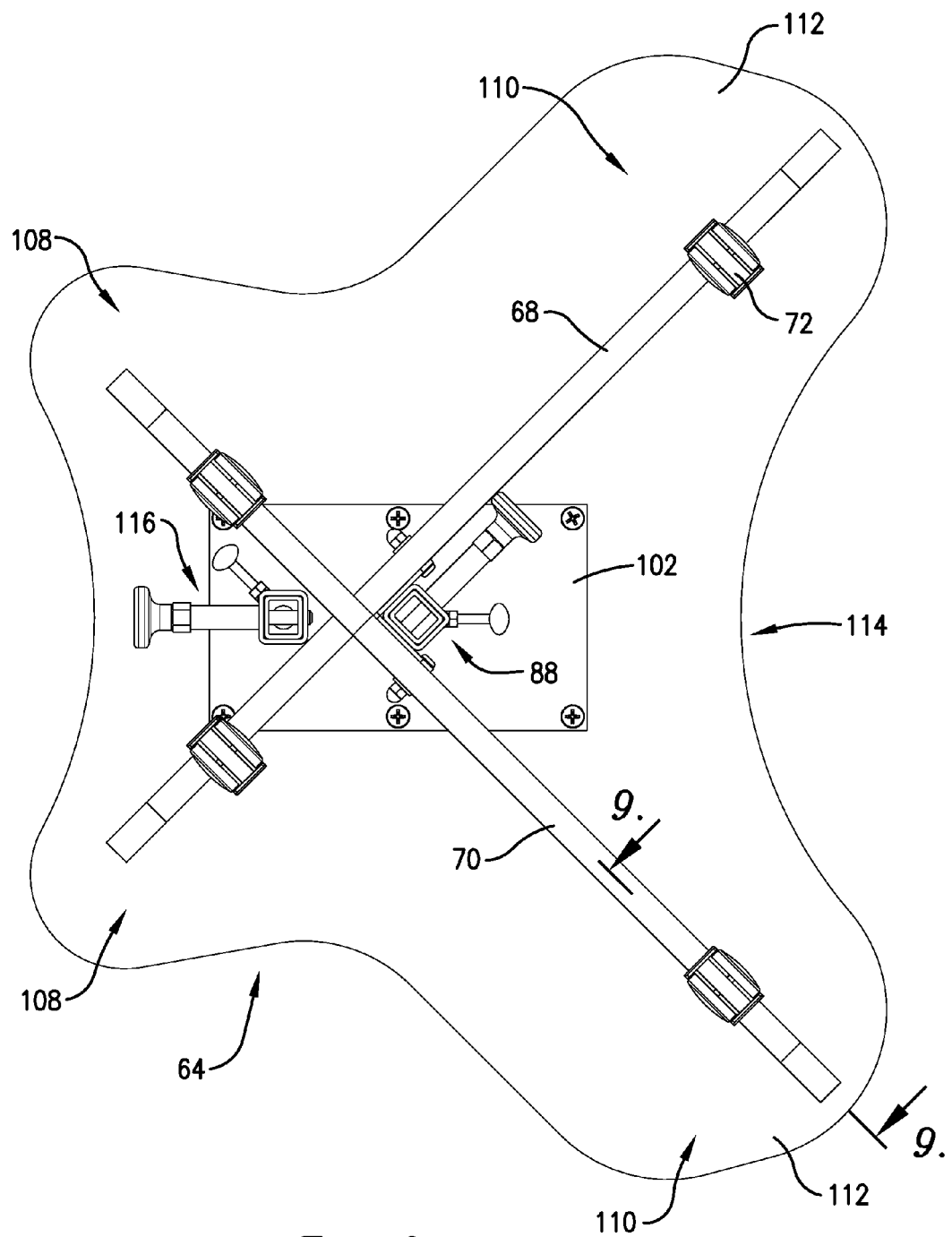
FIG. 8 is a bottom elevation view illustrating the underside of the ergonomic chair of FIG. 4.

Referring now to FIG. 8, the general shape and size of the first platform 64 is illustrated. The first platform 64 generally has an arcuate, butterfly shape, although the first platform 64 may have a generally rectangular or square shape or even an oval shape. The first platform 64 can be generally divided into a rearward segment 108 and a forward segment 110. The rearward segment 108 generally encompasses the narrowest width of the first platform 64, whereas the forward segment 110 generally encompasses the widest width of the first platform 64. At its narrowest width, the rearward segment 108 is preferably approximately 5-35 inches in width, more preferably approximately 10-30 inches in width, and most preferably approximately 15-25 inches in width. In a preferred embodiment, the rearward segment 108 is approximately 19 inches in width at its narrowest width. At its widest width, the forward segment 110 is preferably approximately 20-45 inches in width, more preferably approximately 25-40 inches in width, and most preferably approximately 30-35 inches in width. In a preferred embodiment, the forward segment 110 is approximately 31 inches in width at its greatest width. Although the shape and size of the first platform 64 may vary, the width of the first platform 64 at its greatest width is preferably at least 0.5 times greater than a width of the first platform 64 at its narrowest width, so as to accommodate the user's legs resting on the first platform 64. Alternatively, the first platform 64 may have a width that is approximately the same throughout a length of the platform 64.

At its shortest length, a length of the first platform 64 from the rearward segment 108 to the forward segment 110 is preferably approximately 8-24 inches in length, more preferably approximately 12-22 inches in length, and most preferably approximately 16-20 inches in length. In a preferred embodiment, the length of the first platform 64 is 18 inches at its shortest length. At its longest length, a length of the first platform 64 from the rearward segment 108 to the forward segment 110 is preferably approximately 16-32 inches in length, more preferably approximately 18-30 inches in length, and most preferably approximately 22-26 inches in length. In a preferred embodiment, the length of the first platform 64 is 24 inches at its longest length.

The forward segment 110 comprises a pair of arcuate extensions 112. A concave portion 114 is disposed between the extensions 112. Each arcuate extension 112, either alone or in combination with at least a portion of the rearward segment 108, accommodates the user's legs in various positions during use of the chair 60, which is described in more detail below. As can be appreciated, varying sizes of the first platform 64, and specifically, a surface area for the forward segment 110 of the first platform 64, may be desired depending on a height of the user. For example, if the user is tall, such as over 6 feet, the forward segment 110 of the first platform 64, and specifically, a width of the arcuate extensions 112, is preferably larger to accommodate the user's presumably longer legs.

The concave portion 114 accommodates and receives the user's legs when resting on the floor or otherwise hanging off of the chair 60, as also discussed in more detail below. In alternative embodiments of the present invention, the forward segment 110 could include a plurality of concave portions or receiving areas for the user's legs.

The rearward segment 108 also includes a concave portion 115 that accommodates and receives the user's foot, including toes, in certain positions. For example and as described in more detail below, if the user folds their legs underneath their buttocks, so that the user's shins are resting on the first platform 64, the user's toes may hang off of the back of the first platform 64. The concave portion 115 provides room for the user to flex their feet and toes over the rearward segment 108 of the first platform 64.

Figure 6A:
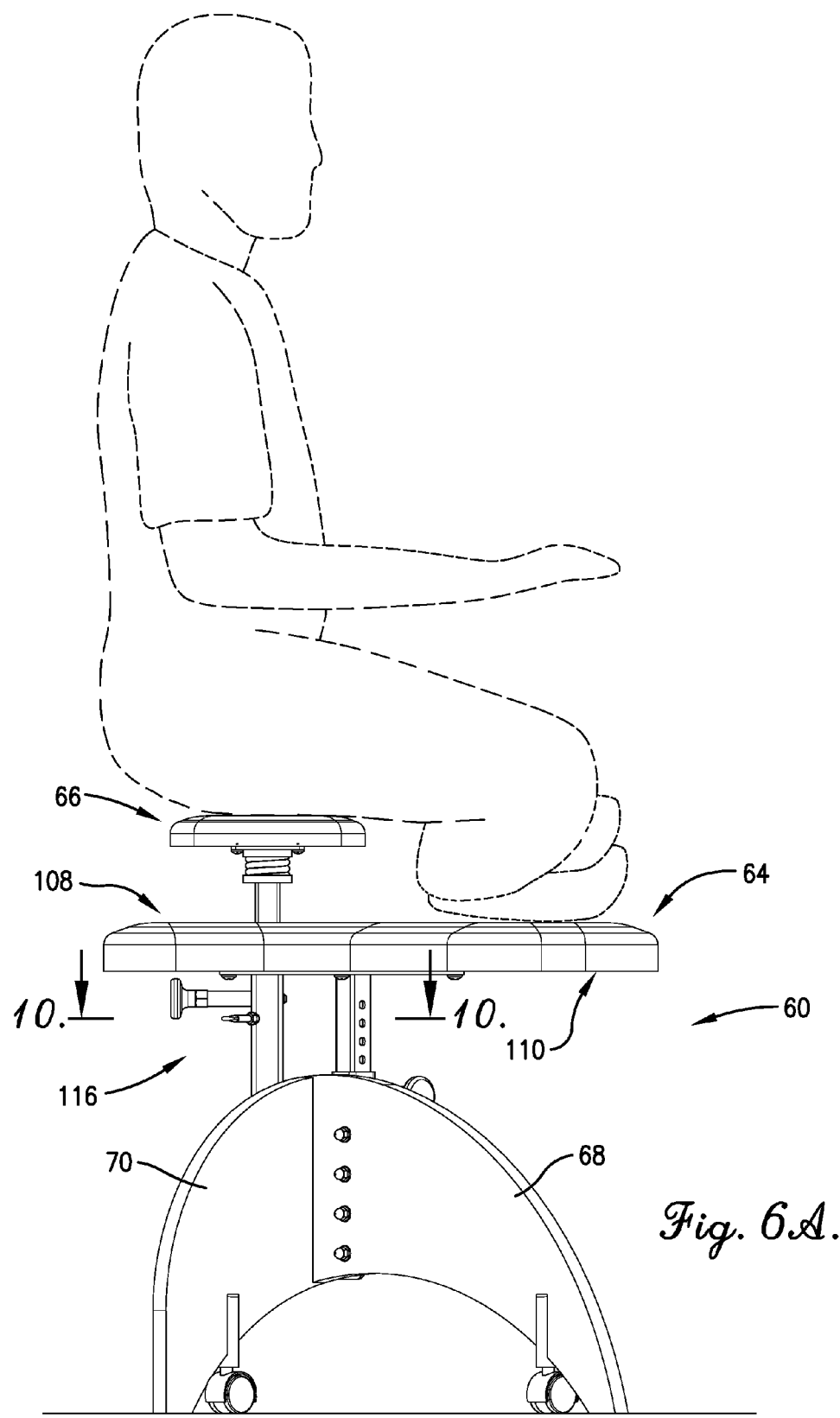
FIG. 6A is a side elevation view of the ergonomic chair of FIG. 4 and illustrating a user sitting on the chair cross-legged in phantom.
Figure 6B:
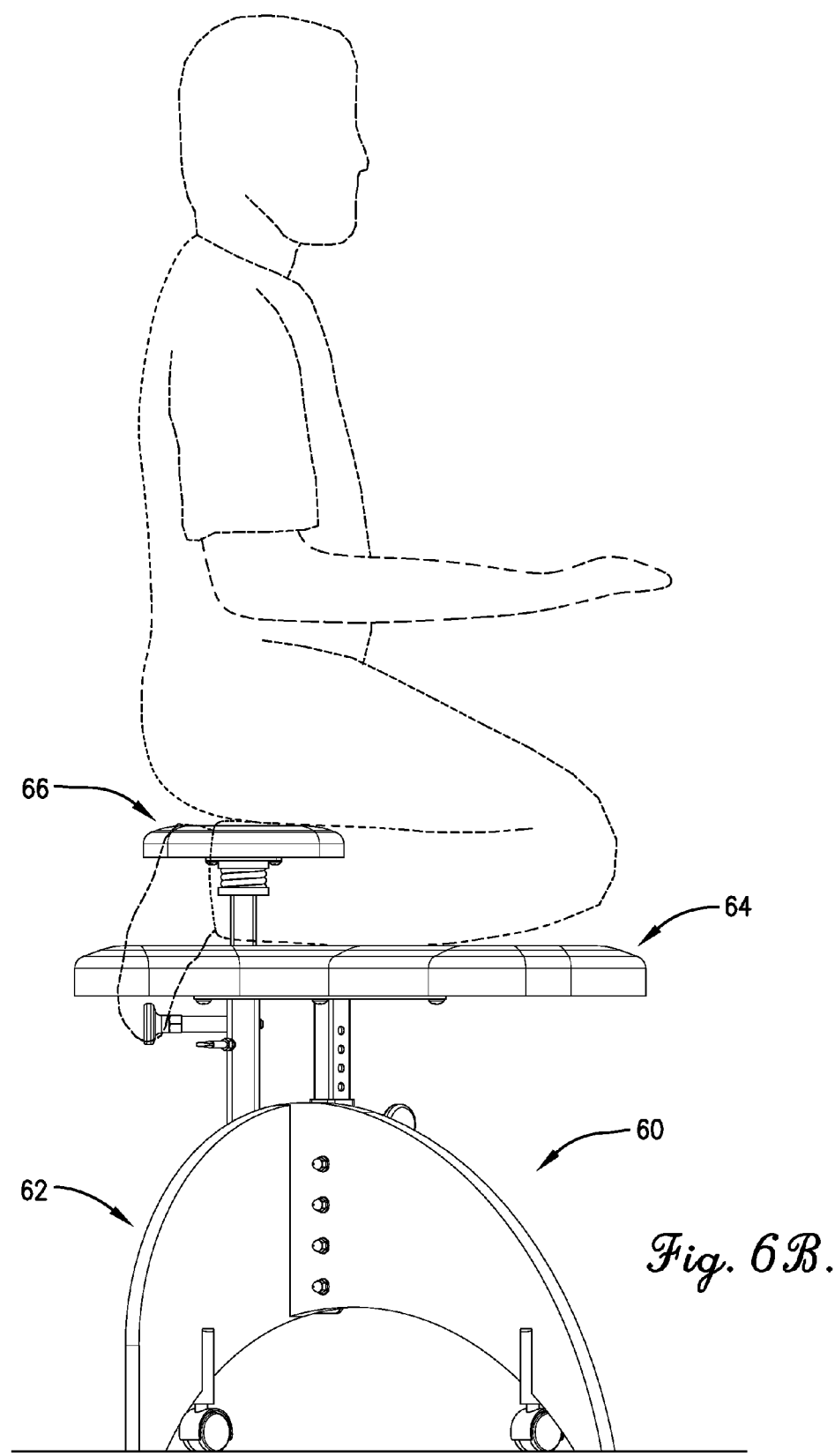
FIG. 6B is a side elevation view of the ergonomic chair of FIG. 4 and illustrating the user sitting on the chair with their legs folded underneath their buttocks and their legs resting on the first platform.
Figure 7:
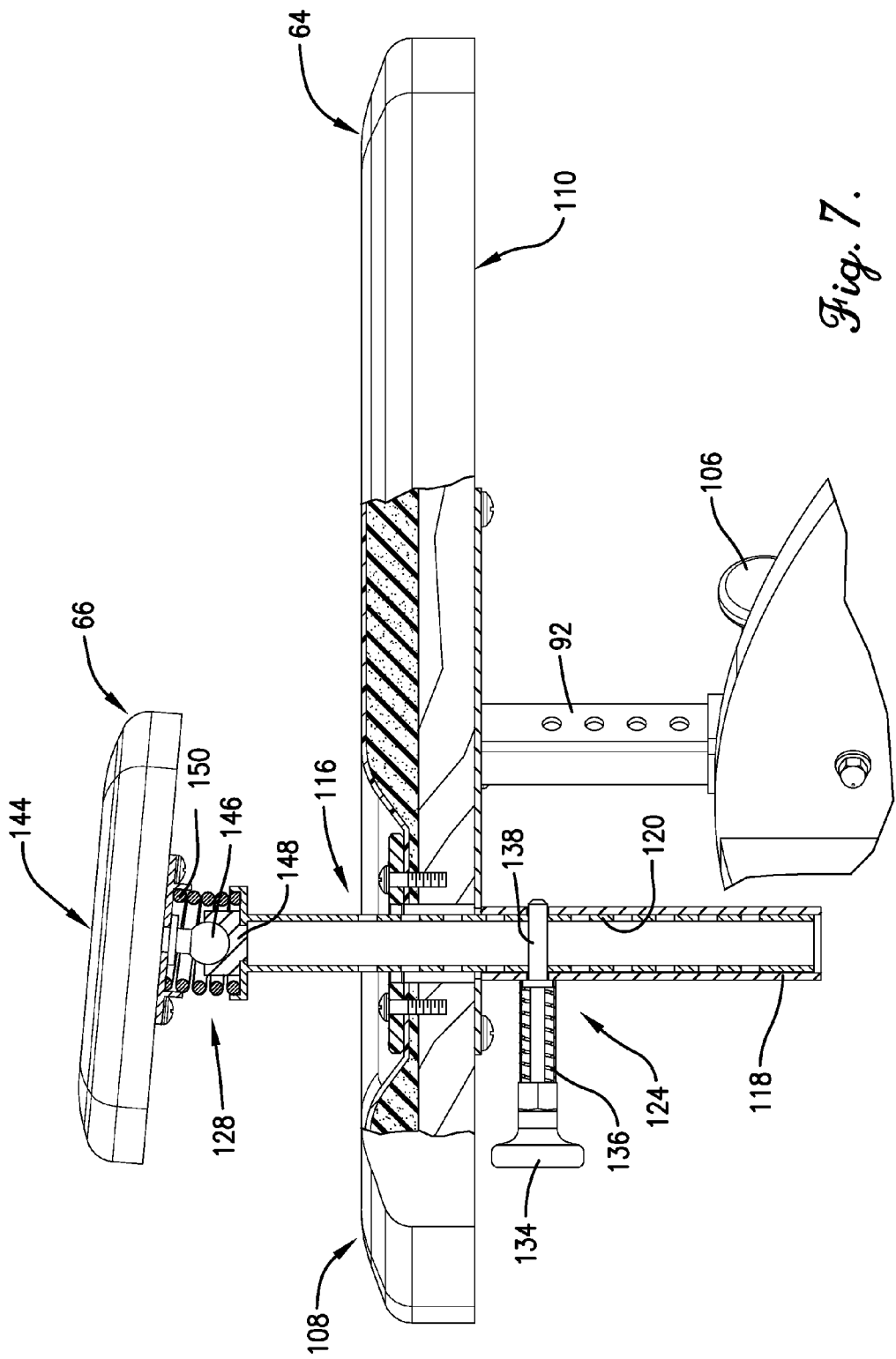
FIG. 7 is a fragmented, partially vertical cross-sectional view of first and second mounting assemblies of the chair of FIG. 4 and particularly illustrating the second mounting assembly for connecting the second platform to the first platform.

Referring to FIGS. 4 and 6-7, the second platform 66 is positioned vertically above the rearward segment 108 of the first platform 64. The second platform 66 is coupled with the first platform 64 using a height-adjustable second mounting assembly 116. In preferred embodiments of the present invention, the second platform 66 rises vertically above the first platform 64 a distance of approximately less than 15 inches, more preferably approximately less than 10 inches, and most preferably approximately less than 8 inches. It is to be appreciated, however, that a specific user may vary the preferred height of the second platform 66 relative to the first platform 64 depending on a desired leg position, the user's height, and the user's flexibility and strength at a particular time of use.

The second mounting assembly 116 is similar to the first mounting assembly 88 used for coupling the first platform 64 to the base 62. In particular and referring to FIGS. 7 and 12, the second mounting assembly 116 comprises a third, outer tube 118 secured to the first horizontal plate 102 of the first mounting assembly 88, a telescoping fourth, inner tube 120 secured to an underside 122 of the second platform 66, a second spring-loaded lock 124 coupled to the third tube 118 for removably locking the third and fourth tubes 118,120 together, and a thumbscrew 126 for tightening the fourth tube 120 around the third tube 118.

In more detail, the third and fourth telescoping tubes 118, 120 are similar to the first and second telescoping tubes 90,92 and are preferably generally rectangular and formed of steel or other suitable material capable of withstanding the weight of the user. The third tube 118 is welded to or otherwise integral with the first horizontal plate 102 secured to the underside 94 of the first platform 64, as illustrated in FIG. 12. The fourth tube 120 is indirectly coupled, via an adjustable tilt assembly 128, to a second horizontal plate 130 secured to the underside 122 of the second platform 66. As can be appreciated, varying-shaped tubes 118,120 may be used, such as square or circular.

As noted above, the fourth tube 120 telescopes within the third tube 118, such that the fourth tube 120 has a smaller diagonal than the third tube 118. As best illustrated in FIG. 12, the fourth tube 120 includes a plurality of openings 132 vertically spaced approximately equidistant along at least a portion of a length of the fourth tube 120. The second spring-loaded lock 124 coupled to the third tube 11 can then be used to manually select an exposed length of the fourth tube 120, and therefore, a height of the second platform 66 relative to the first platform 64.

Referring to FIG. 7 and similar to the first spring-loaded lock 96, the second spring-loaded lock 124 includes a handle 134, a spring 136 operable to be manually compressed by forward actuation of the handle 134, and a pin 138 having a length approximately the same as or less than a width of the third tube 118 and a diameter less than a diameter of the vertically spaced openings 132 along the fourth tube 120. The user can manually compress the handle 134 to compress the spring 136 and push the pin 138 through a selected opening. Once the pin 138 is positioned through the selected opening, the user can release the forward actuation of the handle 134, which releases the tension on the spring 136. The height of the second platform 66 can then be readjusted by repeating the above locking process for the second spring-loaded lock 124.

Referring to FIG. 10 and similar to the first mounting assembly 88, the thumbscrew 126 is used to tighten the third tube 118 around the fourth tube 120. The thumbscrew 126 includes a plurality of male threads 140 that mate with female threads (not shown) in a hex nut 142 secured to the third tube 188 tube.

As can be appreciated, other locking mechanisms can be employed for removably and securely locking the second platform 66 at a preferred height, such as pneumatics or electro-mechanical servo control.

As best illustrated in FIGS. 11 and 12, the second platform 66 is generally arcuate and scalloped, although it could be other shapes, such as rectangular, oval, or circular. The second platform 66 is sized to receive the user's buttocks and therefore, comprises a surface area that is substantially less than the surface area of the first platform 64, which is sized to receive the user's legs. However, the second platform 66 could present a larger surface area, in comparison to the first platform 64, than as illustrated in the Figures, as long as the size of the second platform 66 does not interfere with the user positioning their legs on the first platform 64. In embodiments of the present invention, a width of the second platform 66 is approximately 5-10 inches, and a length of the second platform 66 is approximately 10-15 inches. The surface area of the first platform 64 is therefore preferably approximately at least 2 times as large as the surface area of the second platform 66, more preferably approximately at least 3 times as large, and most preferably approximately at least 3.5 times as large.

The second platform 66 includes a cushion 144 that is comfortable but supportive of the user's buttocks. Preferably, the cushion 144 supports the ischia of the user's pelvis and is formed of a material that is firm yet sufficiently soft to prevent numbness or bruising of the ischial. In embodiments of the present invention, the cushion 144 comprises air-filled cells. In alternative embodiments of the present invention, the air-filled cells can be adjustable depending on the user's preference.

The first platform 64 also includes a cushion, although it need not provide the firmness of the cushion 144 for the second platform 66. Thus, the cushion for the first platform 64 may be made of softer materials that cushion the user's legs so as to reduce numbness or prevent discomfort.

The tilt assembly 128 for the second platform 66 is best illustrated in FIG. 7 and generally comprises a ball 146, a receiving socket 148, and a spring 150. The tilt assembly 128 is secured to the second horizontal plate 130 on the underside 122 of the second platform 66. As illustrated in FIG. 6A, the spring 150 surrounds the ball 146, which is received within the socket 148 and operable to rotate therein. The user may adjust the angle or tilt of the second platform 66 during use by applying more weight in a particular direction to obtain the desired angle. It is contemplated that the user may adjust the angle or tilt of the second platform 66 by as much as 15°. Use of the tilt assembly 128 also allows the user to readjust the alignment of their spine to a comfortable position as the user changes their leg positions during sitting. As can be appreciated, other assemblies or mechanisms for obtaining a tilt or angle of the second platform 66 can be employed.

As best illustrated in FIG. 6A, the first platform 64 is generally horizontal and parallel to the floor. When the second platform 66 is in a neutral position (i.e., not angled via use of the tilt assembly 128), it is also generally horizontal and parallel to the first platform 64 and the floor. It should be appreciated that the second platform 66 may not be substantially horizontal if a tilt assembly is used that substantially permanently holds the second platform 66 at the user's desired angle. Therefore, it is to be understood that the description of the second platform 66 being generally horizontal is to encompass angling or tilting of the second platform 66 to a desired sitting angle.

In use, the user sits on the second platform 66, as illustrated in FIG. 6A. The user may then position their legs in several sitting positions. In a first sitting position illustrated in FIG. 6A, the user sits cross-legged, such that the user's lower half of their legs are crossed in front of the user's torso and on the first platform 64. In a second sitting position illustrated in FIG. 6B, the user folds their legs under their buttocks so that their shins are resting on the first platform 64. In even further sitting positions, the user may sit in a pinwheel position, such that one leg is crossed and resting on the first platform 64, and the other leg is folded under the user's buttocks. The user may also allow one or both legs to hang over the first platform 64 and rest on the floor. Because the knees or legs of the user's body are supporting the user, a back support is not needed.

It is further noted that the user may choose to raise the second platform 66 to a height higher than a preferred sitting height to facilitate adjusting the various positions of the user's legs on the first platform 64. Once the user's legs are in place, the user may then lower the height of the second platform 66.

In alternative embodiments of the present invention, it is contemplated that the chair 60 could be foldable for ease of carrying and travel. For example, the first platform 64 could fold in half. Alternatively, the second platform 66 could fold so as to be vertically aligned with the first platform 64 (the cushioned surfaces of each platform would then generally lie in the same plane). The base 62 would fold away and against the aligned platforms 64,66, and a handle on the underside of the second platform could then be employed for carrying of the chair 60.

Figure 13:
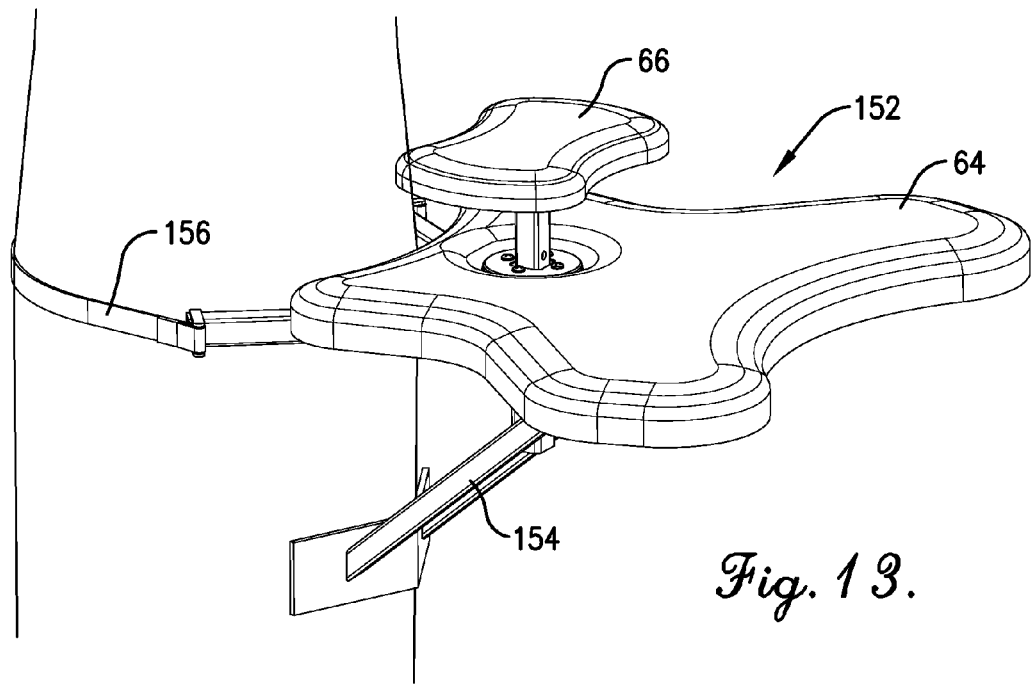
FIG. 13 is a perspective view of an alternative embodiment of the ergonomic chair of the present invention in use as a tree stand.
Figure 14:
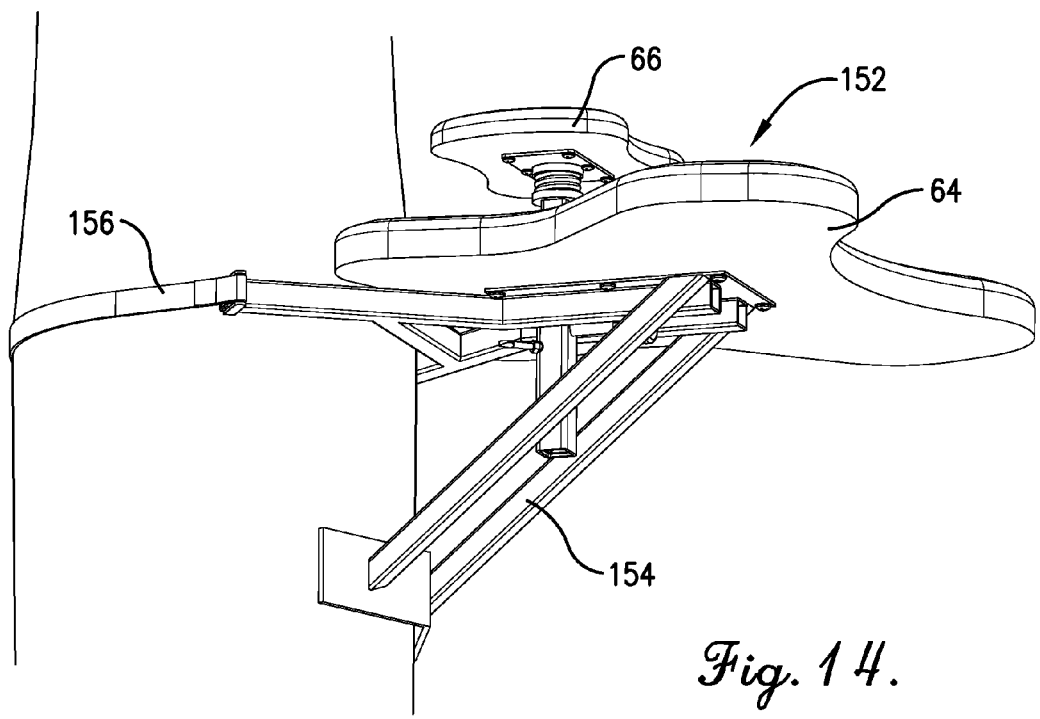
FIG. 14 is a perspective view of the alternative embodiment of FIG. 13 and particularly illustrating the underside of the tree stand.

Although the invention has been described with reference to the preferred embodiment(s) illustrated in the attached drawing figures, it is noted that equivalents may be employed and substitutions made herein without departing from the scope of the invention as recited in the claims. For example, the benefit of the ergonomic chair 60 may be used in environments other than as a desk or task chair 60. As illustrated in FIGS. 13 and 14, a variation of the chair 60 for use as a tree stand 152 could be employed. In particular, the tree stand 152 comprises the first and second platforms 64,66 described above for the chair 60, and a base 154 comprising a securement assembly 156 for securing the tree stand 152 to a tree.

As illustrated in FIG. 15, a modified chair 158 could be used in a stadium, such that the modified chair 158 comprises a base 160 and the second platform 66 described above. The base 160 can be removably secured with a coupling assembly 162 mounted in the stadium's seating area. The stadium's seating area would then serve as the platform on which the user rests their legs while sitting.

The ergonomic chair 60 of embodiments of the present invention could also be employed as an alternative seating option of cameramen for boom rigs. A gimbaled version designed to adjust for pitch and roll would make it an option on ships. Alternative embodiments of the present invention could provide alternate seating in earth moving and farm equipment. Moreover, with proper adjustment of active and passive safety equipment, such as restraint harnesses and air bags, the chair 60 could be used in planes, cars, trains, and any number of transportation situations.

In even further embodiments of the present invention where multiple users may use the same ergonomic chair 60, biometric sensors could be incorporated to remember and return the seat (and even boom-supported work surfaces for the desk system) to the desired configuration of the particular user.

Although the ergonomic desk system 10 and ergonomic chair 60 have been separately described herein, it is contemplated that the ergonomic chair 60 could be used with the ergonomic desk system 10, such that user could transition from various sitting positions within the desk system 10 throughout the working day. Due to the movability within the desk system 10 of the office peripherals 16, the user could easily transition their sitting position.

Having thus described embodiments of the present invention, what is claimed as new and desired to be protected by Letters Patent includes the following:

Having thus described embodiments of the present invention, what is claimed as new and desired to be protected by Letters Patent includes the following:

1. An ergonomic chair comprising:
    a base;
    a generally horizontal platform for receipt of a user's legs, wherein the platform is coupled with the base and vertically spaced a distance from a lowermost height of the base to allow the user's lower legs to hang vertically off of the platform while the user is in a first seating position,
    wherein the platform presents a first surface area,
    wherein the platform is comprised of a left longitudinal section, a right longitudinal section, and a center longitudinal section disposed between the left and right longitudinal sections, with each section having a rearmost edge and a frontmost edge, and the longitudinal length of each section, measured in a horizontal plane, spanning from the rearmost edge to the frontmost edge of the respective section,
    wherein the respective frontmost edges of the left and right longitudinal sections extend longitudinally in the horizontal plane beyond the frontmost edge of the center longitudinal section to form left and right forward extensions corresponding to the left and right longitudinal sections and a forward concave depression corresponding to the center longitudinal section,
    wherein the platform has a rearward section and a forward section, and the rearward and forward sections have a width, measured in the horizontal plane, extending from a leftmost edge of the platform to a rightmost edge of the platform, and the forward section includes the collective left and right forward extensions and the forward concave depression of the platform,
    wherein the width of the forward section is greater than the width of the rearward section so as to allow the user to place the user's legs in a cross-legged position on the left and right forward extensions at the left and right longitudinal sections of the platform when the user is in a second seating position; and
    a seat vertically spaced above the platform for receipt of the user's buttocks, wherein the seat presents a second surface area,
    wherein said first surface area of the platform is approximately at least three times as large as the second surface area of the seat, and the seat is vertically spaced above the platform, such that the left and right forward extensions of the platform are configured to receive the user's legs in a cross-legged position while the user's buttocks rest on the seat in the second seating position.

2. The chair of claim 1, wherein the base includes first and second interconnecting supports.

3. The chair of claim 1, wherein the base includes a vertical support and a plurality of generally horizontal arms extending therefrom.

4. The chair of claim 1,
    wherein the platform is coupled with the base via a first mounting assembly including a first pair of telescoping members allowing for positioning of the platform relative to the base at various heights, and
    wherein the seat is coupled with the platform via a second-mounting assembly including a second pair of telescoping members allowing for positioning of the seat relative to the platform at various heights.

5. The chair of claim 1, wherein at least a portion of the platform has a width of greater than approximately 25 inches.

6. The chair of claim 1, wherein the seat includes a tilt assembly that allows a user to variably tilt the seat to an angle of less than 15°.

7. The chair of claim 6, wherein the seat is generally horizontal when in a neutral, untilted position.

8. The chair of claim 1, wherein the chair is foldable.

9. The chair of claim 1,
    wherein the respective rearmost edges of the left and right longitudinal sections of the platform extend longitudinally in the horizontal plane beyond the rearmost edge of the center longitudinal section of the platform to form left and right rearward extensions corresponding to the left and right longitudinal sections and a rearward concave depression corresponding to the center longitudinal section, and wherein the rearward concave depression permits the user to hang the user's toes and ankles off the platform while the user sits with the user's legs positioned underneath the user's buttocks in a third seating position.

* * * * *